United States Patent [19]

Matusz

[11] 4,294,132
[45] Oct. 13, 1981

[54] CYLINDRICAL GEAR WITH HELICAL TEETH

[75] Inventor: Zbigniew Matusz, Warsaw, Poland

[73] Assignee: Fabryka Obrabiarek Precyzyjnych "Ponar-Bruszkow", Pruszkow, Poland

[21] Appl. No.: 946,208

[22] Filed: Sep. 25, 1978

[30] Foreign Application Priority Data

Sep. 29, 1977 [PL] Poland ................................. 201127

[51] Int. Cl.³ .......................................... F16H 55/08
[52] U.S. Cl. ........................................ 74/462; 74/466
[58] Field of Search .......................... 74/460, 466, 462

[56] References Cited

U.S. PATENT DOCUMENTS 2,098,864  11/1937  Forster .................................. 74/466

*Primary Examiner*—C. J. Husar
*Assistant Examiner*—Conrad Berman
*Attorney, Agent, or Firm*—Haseltine & Lake

[57] ABSTRACT

A cylindrical gear wheel having helical teeth with different pitch diameters for the left hand and right hand sides of the teeth and convergent line of teeth in which one side of the teeth are characterized by positive values of addendum modification while the other side of the teeth has negative values of addendum modification. By positive addendum modification is meant an addition to the nominal pitch diameter to obtain the pitch diameter at one side of a tooth and by negative addendum modification is meant a substration from the nominal pitch diameter to obtain the pitch diameter of the other side of the tooth. In the range of normal values of tooth pitch (mn) from 2 to 6 mm or normal tooth module the angular difference of inclination between the left hand and right hand sides of the teeth is within the range of 30' to 3° for pitch diameters up to 500 mn and the addendum modification values are in the range from 0.01 to 4 mn. For a given angular difference of inclination between the left hand and right hand sides of the teeth, the addendum modification value will increase for increasing pitch diameter and for increasing average angle of tooth line inclination.

3 Claims, 2 Drawing Figures

CYLINDRICAL GEAR WITH HELICAL TEETH

FIELD OF THE INVENTION

This invention relates to the design of a cylindrical (spur) gear wheel having two different pitch diameters and covergent line of teeth. The invention is adapted to machine-building industries.

PRIOR ART

The existing design of gear wheels with convergent line of teeth consists in using teeth, whose L.H. and R.H. side lines are slightly inclined so that the average angle is 0 deg. Such design has been based on the application of the straight tooth wheel.

Such a design is used particularly in U.S. industries. and is referred to as the cylindrical bevel gear wheel.

However, it is rather difficult to make such toothed wheels, particularly by means of universal machine tools for gear teeth.

For the range of very small angles of the tooth line inclination, most gear teeth machine tools offer no possibility for exact reproducing the tooth line, and often even prevent selecting the change gears because of too low a transmission gear ratio.

Another disadvantage of such a design is the rather low contact ratio (engagement factor) of the gear train, and consequently reduced strength as well as noisy operation of the toothed wheels.

SUMMARY OF THE INVENTION

Hereafter, various terms will be used which are conventional in gear terminology and are defined hereafter to facilitate an understanding of the invention.

Nominal angles of helix inclination: this refers to the angle of helix inclination on a reference cylinder as shown in FIG. 2.

Tooth pitch: this term refers to the pitch of the teeth as normally used.

Nominal diameters: this refers to the normal diameter of the gear tooth. Since the invention contemplates different tooth angles at the opposite sides of each tooth, the nominal diameters will be different thereat.

Tooth end face profile angles: this refers to the angle of an end face of the gear tooth.

Positive and negative addendum modification: this refers to the variation from the nominal pitch diameter of the pitch diameter at the two sides of the teeth.

The invention seeks a gear wheel design ensuring a convergent line of the R.H. and L.H. sides of the teeth, and tooth variable thickness while maintaining all the known properties of helical teeth.

This objective has been achieved by providing different pitch diameters for both sides of the teeth and thus also different nominal angles of helix inclination, different tooth pitches, different nominal diameters and different tooth end face profile angles; for the range of normal tooth pitch values from 2 to 6 mm, the angular difference of inclination of the L.H. and R.H. sides of the teeth varies within the limits from 30 minutes to 3 deg.

Moreover, positive addendum modification is provided for one side of the teeth, and negative for the other side of the teeth. For pitch diameters up to 500 mm, the addendum modification value ranges from 0.01 to 4 mm, whereby at a given angular difference of inclination, the addendum modification value increases for increasing pitch diameter and average angle of tooth line inclination.

DETAILED DESCRIPTION

Figure 1:
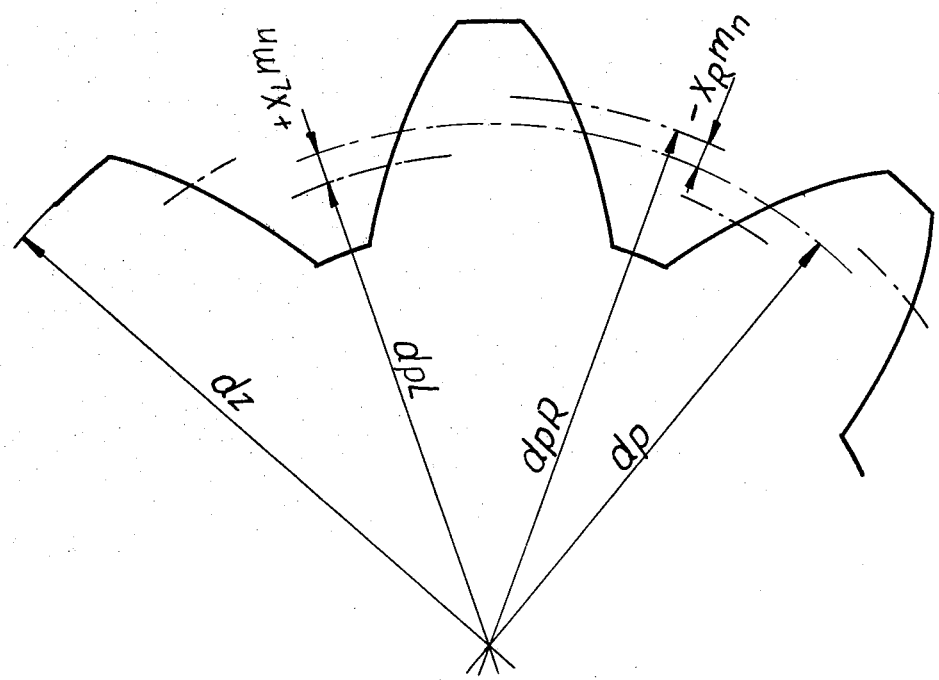
FIG. 1 is an elevation view of a portion of a gear according to the invention.
Figure 2:
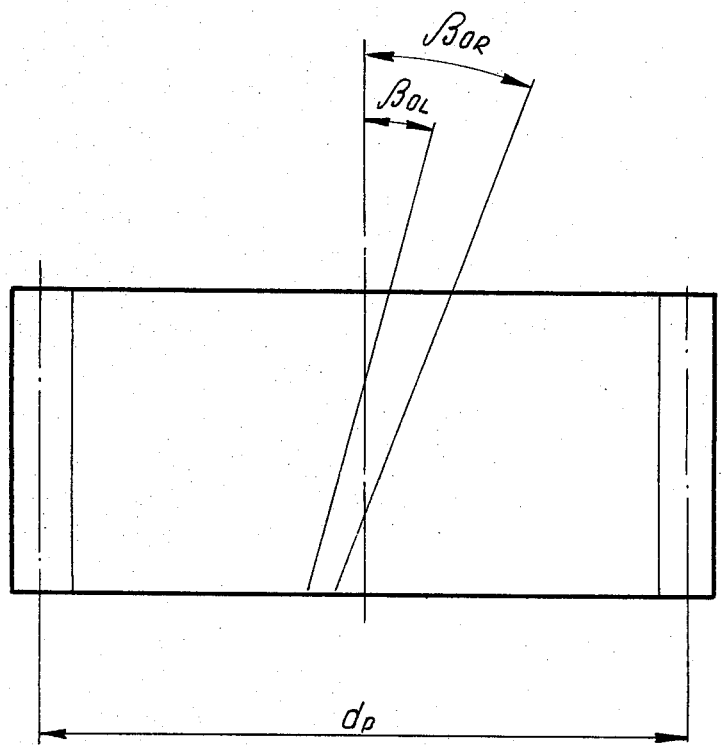
FIG. 2 is a plan view of the gear showing the left hand and right hand sides of a tooth of a gear and the angular inclination thereof.

In the design according to this invention, the L.H. side of the teeth has the pitch diameter $d_{pL}$, while the pitch diameter $d_{pR}$ corresponds to the R.H. side of the teeth. The nominal angle of inclination of the L.H. side of the tooth is $\beta_{OL}$, and $\beta_{OR}$ for the R.H. side.

The relationship between the pitch diameters and the angles of inclination of the sides of the teeth will be found from the following equations:

$$d_{pL} = m_n z / \cos \beta_{OL}$$

$$d_{pR} = m_n z / \cos \beta_{OR}$$

wherein:
  $m_n$ = normal tooth module; wherein $m_n$ is the ratio of the normal pitch to number, $\pi(3.14151)$
  $z$ = number of teeth.
  $t_n$ = normal pitch
  $t_n = m_n \pi$, and $m_n = t_n/\pi$.

The equations and data as set forth herein generally relate to involute module toothed wheels.

The values set forth relate to values characteristic to the present invention and not commonly known relationships. It is generally known that the outside diameter $$d_z = d_p + 2h_g$$

where, $h_g$ is = addendum.

The nominal gear wheel tip diameter $d_z$ is determined from the following equation in relation to the pitch diameter $d_p$ and the average angle $\beta_O$ of the inclination of the sides of the teeth.

In case of normal teeth it is generally assumed that $h_g = m_n$. On the contrary, in the case of so called low teeth ($h_g < m_n$) or high teeth ($h_g > m_n$) $d_p$ is derived from the relationship $$d_p = (m_n \cdot z)/\cos \beta_o.$$

The relationships specified above which are generally known to persons skilled in the art enable the values $d_p$ and $d_z$ to be easily determined.
where:
  $\beta_O = 0.5(\beta_{OL} + \beta_R)$
  $\beta_{OL} = \beta_O - \Delta\beta$
  $\beta_{OR} = \beta_O + \Delta\beta$ The angular difference between the left-hand and right-hand side of tooth is $(2 \Delta \beta)$.

$$2\Delta\beta = \beta_{OR} - \beta_{OL}$$

$\Delta\beta$ denotes the difference between the actual inclination angle of the side of the tooth and the mean tooth inclination angle $\beta_o$. As a consequence:

$$\Delta\beta = \beta_o - \beta_{OL} \text{ and } \Delta\beta = \beta_{OR} - \beta_o$$

Practically, the measurement of the helix angles in a toothed wheel does not offer any difficulties.

The angle $\beta_{OL}$ is to be measured on the pitch diameter $d_pR$.

The angle $\beta_o$ is a theoretical one derived from the equation $$\beta_o = 0.5(\beta_{OL} + \beta_{OR}).$$

These additional explanations are quite obvious to one skilled in the art.
where:
2 $\Delta\beta$ is the angular difference. The invention also applies to toothed wheels wherein, module is not a characteristic value. In countries wherein inch system of units is employed the characteristic value is not module, but either CP (circular pitch) expressed in inches, or DP (diametral pitch) expressed also in inches.

The relationships between DP, CP, and $m_n$ are as follows:

$$m_n = 25.4/DP = (25.4/\pi)CP \text{ mm}$$

$$DP\ 32\ 25.4/m_n$$

$$CP = m_n(\pi/25.4)$$

Assuming for example, that the L.H. side of the teeth has a smaller angle of tooth line inclination and a smaller pitch diameter, the addendum modification for this particular side will be positive and equal to:

$$x_L m_n = 0.5\left(\frac{m_n z}{\cos\beta_O} - \frac{m_n z}{\cos\beta_{OL}}\right) = \frac{m_n z}{2}\left(\frac{1}{\cos\beta_O} - \frac{1}{\cos\beta_{OL}}\right)$$

and accordingly, the addendum modification for the R.H. side of the teeth becomes negative and equal to:

$$x_R m_n = 0.5\left(\frac{m_n z}{\cos\beta_{OR}} - \frac{m_n z}{\cos\beta_O}\right) = \frac{m_n z}{2}\left(\frac{1}{\cos\beta_{OR}} - \frac{1}{\cos\beta_O}\right)$$

As used above, x is the multiplication symbol; L denotes the left hand and P the right hand side.

The definition of the tooth offset is commonly known; previously, this has been termed "correction of teeth". For example, for the left-hand side of the tooth $X_L\ m_n$ denotes the offset of the left-hand sides of the tooth. $X_L$ denotes the coefficient of the offset of the left-hand side of teeth.

Analogous symbols are employed for the right-hand side of the tooth.

All the other relations for helical teeth of cylindrical gear wheels remain valid for the design according to this invention. However, the L.H. and R.H. sides of the teeth must be considered individually since such parameters as tooth diameter, or profile face angle, which determine the tooth shape, have different values according to the side concerned.

The tooth design according to the invention has the following technical and economic properties:

the possibility of providing transmission gears with adjustable pitch play, or with no play whatever;

long life of the transmission gear as the pitch play can be adjusted during the service period;

smooth and even operation of the gear wheels;

higher strength of the transmission gear wheels;

the gear wheels can be made using universal machine tools for teeth.

Application of the gear wheels according to this invention can be a source of substantial effects as offering the possibility of making transmission gear trains based on helical cylindrical gears while maintaining all the properties of the helical gears as compared, for example, to those with straight toothed wheels.

I claim:

1. A cylindrical gear wheel comprising helical teeth having left and right hand sides with different pitch diameters ($d_L$ and $d_R$), different angles of helix inclination ($\beta_{OL}$ and $\beta_{OR}$), different nominal diameters ($d_Z$) and different profile face angles ($xm_n$) within at least a range of normal tooth module ($m_n$) varying from 2 up to 6 mm as the angular difference of inclination ($2\Delta\beta$) between the left hand ($\beta_{OL}$) and right hand ($\beta_{OR}$) sides varies within the range of 30' and 3°.

2. A cylindrical gear wheel as claimed in claim 1 wherein one side of the teeth has a negative addendum modification value ($x_R m_n$) and the other side of the teeth has a positive addendum modification value ($x_L mn$)

3. A cylindrical gear wheel as claimed in claim 2 wherein for pitch diameters up to 500 mm the addendum modification value $Xm_n$ is between 0.01 and 4 mn and for a given angular difference of inclination $2\Delta\beta$, the value of $Xm_n$ increases for increase of pitch diameter and the average angle of tooth line inclination $\beta_O$.

* * * * *